Nov. 19, 1968  C. L. SEEFLUTH  3,412,188
PROCESS FOR BIAXIALLY ORIENTED BOTTLES
Filed Jan. 10, 1966  2 Sheets-Sheet 1

INVENTOR
C. L. SEEFLUTH
BY Young & Quigg
ATTORNEYS

Nov. 19, 1968   C. L. SEEFLUTH   3,412,188
PROCESS FOR BIAXIALLY ORIENTED BOTTLES
Filed Jan. 10, 1966   2 Sheets-Sheet 2

INVENTOR
C. L. SEEFLUTH
BY Young & Quigg
ATTORNEYS

United States Patent Office 3,412,188
Patented Nov. 19, 1968

3,412,188
PROCESS FOR BIAXIALLY ORIENTED BOTTLES
Charles L. Seefluth, Bartlesville, Okla., assignor to Phillips Petroleum Company, a corporation of Delaware
Filed Jan. 10, 1966, Ser. No. 519,639
1 Claim. (Cl. 264—92)

ABSTRACT OF THE DISCLOSURE

Biaxially oriented bottles are blown from temperature conditioned preformed parisons having a wall which increases in thickness starting at the open end thereof. A centering/stretching pin forces the closed end of the parison toward the opposite mold wall as the bottle is being blown at a rate such that the bubble stretches longitudinally and not the parison, thus imparting biaxial orientation to the wall of the bottle.

This invention relates to a method of forming oriented thermoplastic articles. In one aspect this invention relates to a method for forming a hollow thermoplastic article comprising forming a parison having an area with a wall thickness less than that of the rest of said parison, heating the parison in a mold to a temperature below the crystalline melt point of the parison, placing the heated parison into an article mold and applying a differential pressure to the parison to cause it to form a bubble and stretching the closed end of the parison toward the opposite mold wall as the article is being formed at a rate such that the bubble stretches longitudinally and not the parison, thus imparting biaxial orientation to the wall of the bottle. A problem encountered in blow molding thermoplastic articles, such as bottles, is distributing the material so that the finished article has a wall thickness which is substantially uniform throughout, as well as being biaxially oriented. I have now discovered that by stretching the closed end of the parison as the parison is being blown into conformity with the mold that there is achieved not only a uniform wall thickness in the resulting article but, in addition, there is imparted orientation.

It is therefore an object of this invention to provide a novel mthod for producing a biaxially oriented thermoplastic article. Another object is to provide a method of forming a thermoplastic bottle having uniform wall thickness throughout and which, in addition, is biaxially oriented.

Other aspects, objects, and the several advantages of this invention will be apparent from a study of this disclosure, the drawings, and the appended claims.

According to the invention a parison having a closed end with a wall thickness less than that of the rest of the parison is heated to a temperature just below the crystalline melt point of the parison material, and the parison is placed into a mold and blown. The parison is placed into the mold so that the closed end of the parison is near the wall of the mold. As the blowing proceeds, the parison forms a bubble which is then stretched toward the opposite mold wall at a rate such that the bubble stretches longitudinally and not the parison.

The material used for forming the parison can be any thermoplastic material, such as polyethylene, polypropylene, polybutene and copolymers thereof. The preferred thermoplastic material is polypropylene. Other suitable thermoplastic materials include polystyrene, polyvinylchloride and copolymers thereof, polyvinyl alcohol, and the like.

The crystalline melt point of polymers such as polypropylene can be determined by heating a small piece of plastic (usually film) under crossed polaroids in a microscope equipped with means for heating the polymer. The specimen is heated slowly and the crystalline melting point is the temperature at which birefringence disappears.

Figure 1:
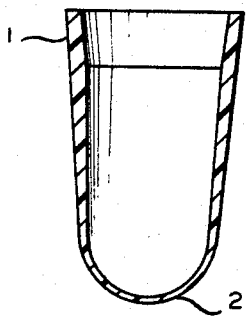
Figure 2A:
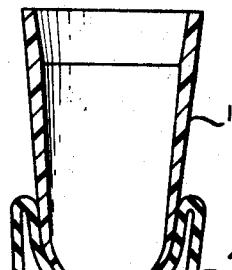

The parison can be heated in a mold which has a high thermal conductivity and which has a flexible liner made of a material, such as rubber, which has a relatively low thermal conductivity but a higher thermal conductivity than that of the parison. After heating to the desired temperature, the parison is pushed out of the mold by applying a fluid pressure to the area between the flexible liner and the mold, thus causing the flexible liner to be peeled from the parison. The invention can be better understood by reference to the accompanying drawings, of which FIGURE 1 is a cross section through a parison according to the invention FIGURE 2a is a heating apparatus showing heating of the parison, FIGURE 2b is a heating apparatus showing the method of removal of the heated parison; FIGURES 3a, 3b, 3c, and 3d show the various stages of blowing the parison according to the invention.

Referring now to FIGURE 1, a parison 1 of thermoplastic material is shown having a closed end 2 and an open end. As previously mentioned, the parison can be composed of any thermoplastic material, such as polyethylene, polypropylene, polybutene and copolymers thereof.

Referring now to FIGURES 2a and 2b, mold 3 of high heat conductivity, having a flexible liner 4, defines a shape suitable for heating a parison 1. Mold 3 is provided with electrical resistance elements 5 to provide means for heating the mold to a suitable temperature. Other heating means, such as a circulating fluid of heated material, can be provided instead of the resistance wires 5. A conduit 6 is connected to an air hose 7 which is adapted to provide fluid pressure to be introduced between the flexible liner 4 and the mold 3. In operation, after the parison 1 has been heated to a suitable temperature, fluid pressure is introduced through line 7 and conduit 6 to push the parison out of the mold. As can be seen in FIGURE 2b, the flexible liner 4 is peeled from the parison 1 as the parison is stripped from the mold. The fluid pressure in the area 8 pushes the flexible liner upwardly and, thus, peels the flexible liner from the parison 1.

The flexible liner can be made of rubber or any flexible material which has a higher heat conductivity than the parison and a substantially lower heat conductivity than that of the mold. The mold can be formed of any suitable high heat conductivity material, such as aluminum, carbon steels and stainless steels, and copper.

Referring now to FIGURE 3, mold halves 10 and 12 form a suitable mold cavity 11 for a blow molded thermoplastic article. A mandrel 13 holds parison 1 and introduces fluid pressure into the interior 14 of the parison.

Figure 3A:
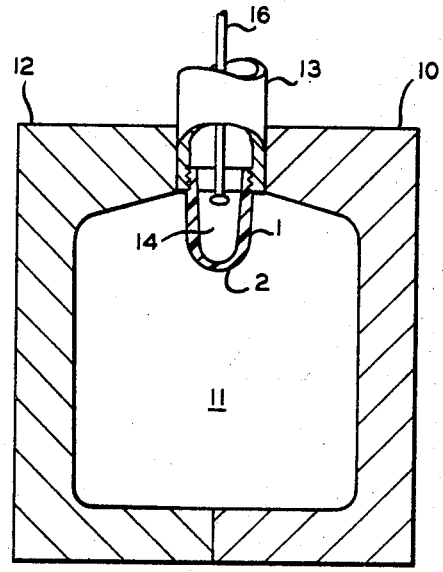
Figure 3B:
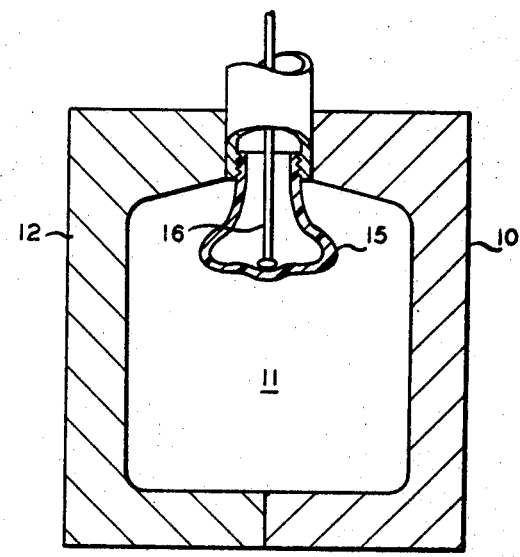
Figure 3C:
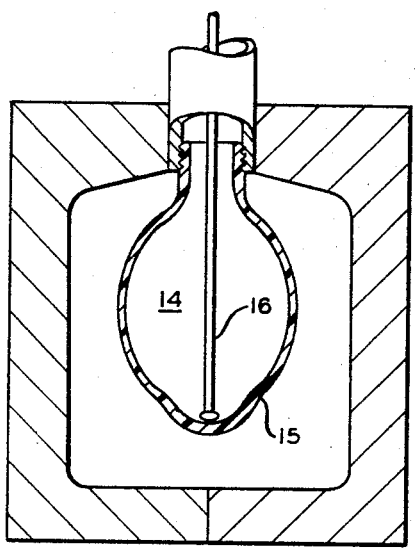
Figure 3D:
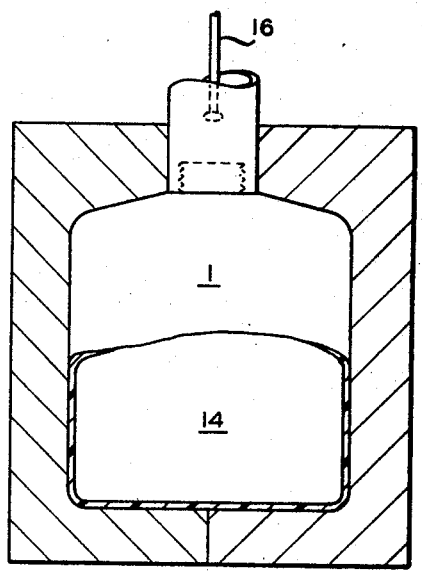

In operation, a parison 1 having a thinned end portion 2 is held on mandrel 13 and introduced into mold cavity 11. A differential pressure is introduced across the wall of parison 1 causing the parison to expand. This pressure differential can be introduced by blow molding or vacuum molding. In the case of vacuum molding, suitable vacuum ports (not shown) can be included in the walls of mold halves 10 and 12. The first step of the blowing operation is shown in FIGURE 3b. As the parison 1 begins to expand, the thinned portion 2 expands first forming a bubble 15. Stretching rod 16 contacts the lower portion of the bubble 15 and as the expansion continues serves to stretch the bubble as formed as shown in FIGURE 3c. In this manner it is the bubble and not the parison which is stretched and the parison serves to provide additional material to the bubble as it enlarges. Thus, the area of thinned wall thickness expands first and those areas adjacent that area of thinned wall section and thus adjacent the bubble are expanded next in the sense that the thermoplastic material composing same goes into assisting in the enlarging of the bubble as it is stretched by means of the stretching rod. This type of blowing operation produces a highly oriented thermoplastic article. The completely blown article is shown in FIGURE 3d. In FIGURE 3d, the stretching rod 16 has been withdrawn and the parison 1 has been completely expanded to fill the mold cavity.

By designing the parison so that the wall is weakest near the neck and blowing the bubble in the mold from the neck to the bottom while stretching rod 16 stretches and centers the parison, multiple advantages are obtained simultaneously. The parison wall becomes a more uniform thickness from top to bottom which facilitates injection molding, reheating, transfer to mandrel, stretching, and more uniform bottle wall thickness, particularly in the bottom corners where it is now thin and in the waist where it is now thick. The thread clamps can be positioned in final position and clamped directly by the mold for good thread forming and it eliminates a programed portion of the machine motion which may otherwise be necessary to bring the thread clamps into final position in the mold. The stretching rod motion may be only sufficient to stretch the bubble rather than the parison, thus eliminating push-through or forcing the stretching rod through the end of the parison which often happens when an attempt is made to stretch the parison wall without first forming a bubble. In addition, successive uniaxial stretch which produces vertical ribbing is eliminated and concurrent biaxial stretch is obtained, which is preferable for strength and clarity. In addition, by use of the pin or stretching rod there is achieved improved stretching and orientation in the bottom portion of the parison.

The following example will further illustrate the invention.

*Example*

A parison 3 inches long having one closed hemispherical end .594 inch in outside diameter and .065 inch thick and one open end .838 inch in outside diameter and .057 inch thick, the wall thickness tapering from the open end to a section .111 inch thick about .380 inch from the open end then tapering to the hemispherical end section, and the outside surface smoothly tapering, similar in appearance to that of FIGURE 1, was produced by conventional injection molding from polypropylene having a density of 0.905 gram per cc. and a melt flow (ASTM D1238–57T, Condition L) of 6.5.

Figure 2A:
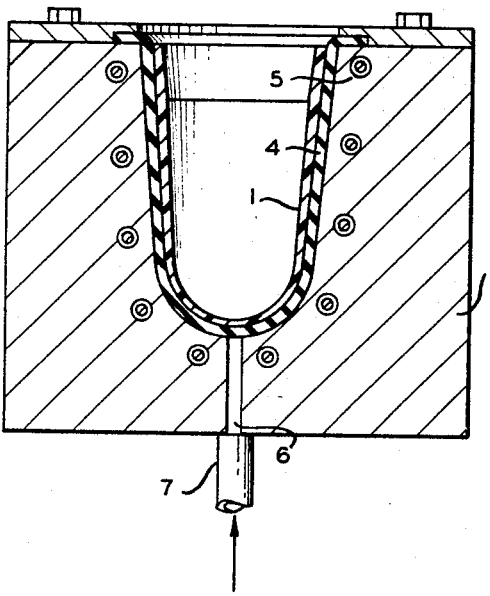
Figure 2B:
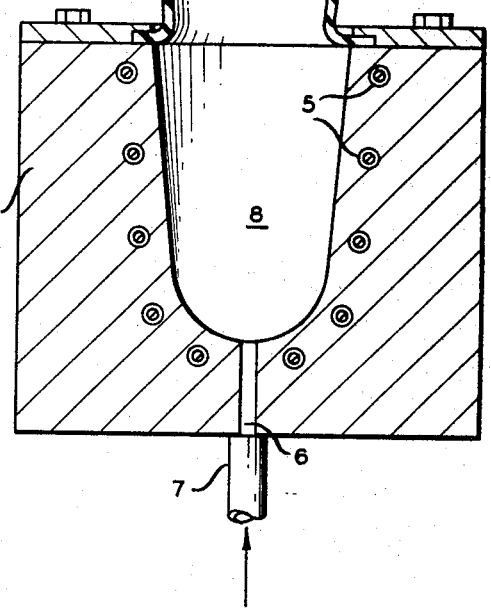

This parison was inserted into a heating device similar to that of FIGURE 2 having a block temperature of 335° F. and was heated for about 3.5 minutes. Air at about 5 p.s.i. pressure was introduced between the block and the liner, thus forcing the parison upward and onto a blowing and thread forming mandrel where the threads were formed by clamping and pressing the neck mold member firmly together about the first .5 inch near the top of the parison.

The mandrel held parison, in the vertical position with the threads uppermost, was then enclosed in a 7 ounce bottle mold (a mold for a bottle which has a 7 ounce water capacity). Air under pressure was admitted to the inside of the parison to form a bubble and simultaneously a stretching rod or pin stretches the bubble at a rate corresponding to the development of the blowing parison bubble and serves to stretch the bubble until it develops into the desired mold shape. Two additional seconds were allowed for the mold to cool the bottle, after which the mold was opened and the bottle removed. The resulting bottle was filled with water, capped, and brought to a temperature of 35° F. and dropped three times onto a concrete surface from a height of 8 feet without breaking or subsequently leaking.

Another such bottle produced from the same polymer and in the same manner as the first was cut into tensile specimens. The wall samples showed tensile strengths varying between 10,000 and 20,000 pounds per square inch as compared to 5000 to 6000 p.s.i. for unoriented polypropylene.

Other bottles made by this same process from this same polymer were judged by several experts in the field of plastic packaging to have exceptional clarity for an unmodified polypropylene bottle.

Samples taken from bottles made by conventional blow molding of the same polymer exhibit tensile strength in the range of unoriented polymer, and such bottles break when filled with water, capped, brought to a temperature of 35° F. and dropped onto a concrete surface from a height of 8 feet.

Reasonable variations and modifications are possible within the scope of this disclosure without departing from the spirit and scope of the invention.

I claim:

1. A method for forming a biaxially oriented thermoplastic article comprising forming a parison having a closed end and an open end, and tapered in wall thickness from said open end to said closed end, heating the parison to a temperature just below the crystalline melt point, placing the heated parison into an article mold, introducing differential fluid pressure between the inside of said parison and the mold cavity so that the closed end of the parison expands and forms an unsupported bubble, mechanically stretching the resulting bubble toward the mold wall opposite the closed end of said parison at a rate such that the bubble stretches longitudinally and not the parison, completely expanding the stretched bubble so as to contact all the mold walls and conform therewith, thereby molding the parison into an article having the shape of the mold.

References Cited

UNITED STATES PATENTS

| | | | |
|---|---|---|---|
| 2,114,794 | 4/1938 | Bratring | 264—314 X |
| 2,315,478 | 3/1943 | Parkhurst | 264—94 |
| 2,878,513 | 3/1959 | Slaughter | 264—94 |
| 2,919,462 | 1/1960 | Friden | 264—99 |
| 3,244,778 | 4/1966 | Ninneman | 264—97 X |
| 3,294,885 | 12/1966 | Cines et al. | 264—99 |
| 3,311,684 | 3/1967 | Heider | 264—98 X |
| 3,241,644 | 9/1967 | Allen | 264—97 |

ROBERT F. WHITE, *Primary Examiner.*

A. R. NOE, *Assistant Examiner.*